(12) United States Patent
Gomola

(10) Patent No.: US 9,228,667 B2
(45) Date of Patent: Jan. 5, 2016

(54) PRESSURE-LIMITING VALVE

(75) Inventor: Marek Gomola, Brno (CZ)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 14/114,745

(22) PCT Filed: Mar. 8, 2012

(86) PCT No.: PCT/EP2012/054015
§ 371 (c)(1),
(2), (4) Date: Oct. 29, 2013

(87) PCT Pub. No.: WO2012/146431
PCT Pub. Date: Nov. 1, 2012

(65) Prior Publication Data
US 2014/0060672 A1    Mar. 6, 2014

(30) Foreign Application Priority Data

Apr. 29, 2011   (DE) .......................... 10 2011 017 765

(51) Int. Cl.
| | | |
|---|---|---|
| *F16K 15/06* | (2006.01) | |
| *F16K 17/04* | (2006.01) | |
| *F02M 63/00* | (2006.01) | |

(52) U.S. Cl.
CPC ............ *F16K 17/048* (2013.01); *F02M 63/005* (2013.01); *F02M 63/0054* (2013.01); *F16K 15/063* (2013.01); *F16K 17/04* (2013.01); *Y10T 137/7849* (2015.04)

(58) Field of Classification Search
CPC ....... F16K 15/025; F16K 15/06; F16K 17/30; F16K 15/063; F02M 63/0054; Y10T 137/7849
USPC ............................. 137/536, 535, 540; 251/324
See application file for complete search history.

(56) References Cited

U.S. PATENT DOCUMENTS

2002/0096217 A1   7/2002 Wu et al.
2006/0037647 A1*  2/2006 Okuda et al. ............. 137/543.23

FOREIGN PATENT DOCUMENTS

CN    101415978    4/2009
DE    102007016010   10/2008
(Continued)

OTHER PUBLICATIONS

International Search Report for Application No. PCT/EP2012/054015 dated Jul. 5, 2012 (2 pages).

*Primary Examiner* — Kevin Lee
*Assistant Examiner* — P. Macade Nichols
(74) *Attorney, Agent, or Firm* — Michael Best & Friedrich LLP

(57) ABSTRACT

A pressure-limiting valve is proposed, in particular for a common rail system. The pressure-limiting valve comprises a valve support (10), a valve insert (12) which is connected to the valve support (10), a valve piston (14) which is mounted such that it can slide in the valve insert (12), and a closing spring (16) which acts on the valve piston (14) with a closing force in the closing direction. By means of the closing force, the valve piston (14) acts on a valve seat (18) which produces a hydraulic connection via a valve chamber (40) between a high-pressure space (33) and a low-pressure space (36), as soon as the hydraulic force which acts on the valve piston (14) in the opening direction exceeds the closing force of the closing spring (16). When the valve seat (18) is closed, a leakage gap (50) is formed between the valve chamber (40) and the low-pressure space (36), which leakage gap (50) makes it possible for the leakage to be discharged out of the valve chamber (40) into the low-pressure space (36).

12 Claims, 2 Drawing Sheets

(56) References Cited

FOREIGN PATENT DOCUMENTS

| | | |
|---|---|---|
| DE | 102009032850 | 1/2011 |
| FR | 2894641 | 6/2007 |
| GB | 2116293 | 9/1983 |
| WO | 2004083695 | 9/2004 |

\* cited by examiner

PRESSURE-LIMITING VALVE

BACKGROUND OF THE INVENTION

The invention relates to a pressure limiting valve, in particular for common rail systems.

Pressure-limiting valves for common rail systems are used to limit the pressure in a high-pressure reservoir or a common rail injection device. The pressure-limiting valve performs the task of limiting the maximum rail pressure in the system in order to protect the system components in the event of a malfunction. The pressure-limiting valve has further the task of providing a minimum pressure in the high-pressure reservoir (common rail) for an emergency operation of a motor vehicle; thus enabling the motor vehicle to reach the repair shop under its own propulsion.

Such a pressure-limiting valve is known from the WIPO patent application WO 2004/083695 A1. This pressure-limiting valve has a valve support and a valve insert which is connected to the valve support, a valve piston being mounted such that it can slide in the valve insert. The valve piston acts with a valve seat face on a valve seat on the valve insert, the valve seat face being seated on the valve seat in the closed state of the pressure-limiting valve. The closing force of the valve piston is produced by a compression spring which is accommodated in the valve support. The pressure-limiting valve is inserted into a housing which comprises a high-pressure connection to a high-pressure reservoir (common rail) and a low-pressure connection for a return line. In so doing, the valve piston in the valve insert separates a high-pressure valve chamber, into which the high-pressure connection opens out, from a low-pressure chamber, the low-pressure connection leading out of said low-pressure chamber.

SUMMARY OF THE INVENTION

It is the aim of the present invention to provide a pressure-limiting valve in which the opening pressure is not reduced due to a leakage pressure that builds up when the valve piston is closed.

The aim of the present invention is met by a leakage gap formed between the valve chamber and the low-pressure space when the valve seat is closed, which leakage gap makes it possible for the leakage to be discharged out of the valve chamber into the low-pressure space. By discharging a leakage which forms when the valve seat is closed into a low-pressure space, it is assured that a leakage pressure, which acts as an assistant pressure against the opening pressure, does not build up in the valve chamber which is formed in the guide bore between the valve seat and the guide section of the valve piston as a result of the leakage accumulating there. The opening pressure of the pressure-limiting valve is thus only determined by the closing force of the closing spring.

It is advantageous if the leakage gap is embodied in the axial direction by two sides between guide bore and valve piston, namely by a leakage connection on the valve chamber side and a leakage connection on the low-pressure side. In so doing, the leakage connection on the valve chamber side is formed by a radial relief groove, into which a flat spot embodied on the valve piston extends when the valve seat is closed. The valve piston preferably has three flat spots that are evenly distributed across the circumference thereof. The leakage connection on the low-pressure side is formed by an axial relief channel which connects the radial relief groove to the low-pressure space.

The radial relief groove is expediently embodied in a circumferential manner on the inside of the guide bore in the region of the guide section. The axial relief channel is formed by a flat spot configured on the valve piston or by an axial groove.

BRIEF DESCRIPTION OF THE DRAWINGS

An exemplary embodiment of the invention is depicted in the drawings and explained in detail in the description below.

In the drawings.

DETAILED DESCRIPTION

Figure 1:
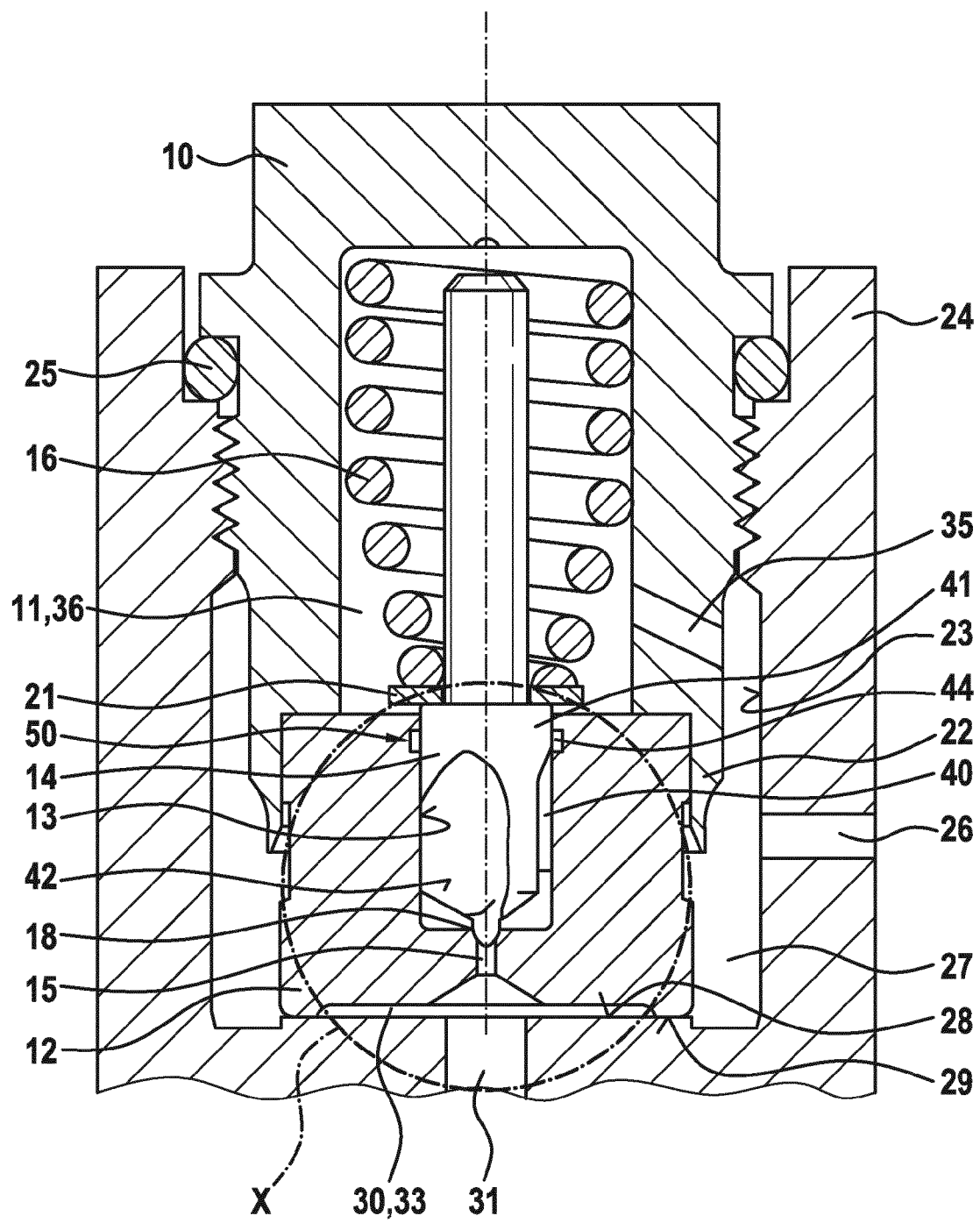
FIG. 1 shows a sectional representation of an inventive pressure-limiting valve mounted in a housing and FIG. 2 shows an enlarged sectional representation of the view X in FIG. 1.

The pressure-limiting valve in FIG. 1 comprises a valve support 10 having a receiving space 11 for a closing spring 16 and a valve insert 12 having a guide bore 13. A valve piston 14 is guided in a guide section 41 of the guide bore 13. The guide bore 14 has a throttle bore 15 at the bottom thereof. A valve seat 18 is configured in the bottom of the guide bore 15 around the throttle bore 15. A valve seat face 19 embodied on the valve piston 14 is seated on the valve seat 18 when the pressure-limiting valve is closed. The closing force exerted on the valve piston 14 to seat on the valve seat 18 is produced by a closing spring 16 designed as a compression spring. The closing spring 16 is thereby supported on an adjusting disk 21 on the valve seat side and on an inner end face of the receiving space 11 at the opposite side. The valve support 10 furthermore encompasses the valve insert 12 with a shoulder 22 and is rigidly connected to the valve insert 12 at this location.

The pressure-limiting valve is inserted into a receiving area 23 of a housing 24. To this end, a thread is embodied on the valve support 10, which is screwed into a mating thread at the receiving area 23. In order to achieve a leakproof insertion of the pressure-limiting valve into the receiving area 23 of the housing 24, a sealing ring 25 is screwed between valve support 10 and receiving area 23. An annular chamber 27, which has a hydraulic low-pressure connection 26 at its disposal, is formed in the receiving area 23 between the outer walls of the valve support 10 and the valve insert 12, said hydraulic low-pressure connection being connected to an unspecified low-pressure/return line.

A plane surface 28, on which the valve insert 12 is seated with an annular face 29 thereof, is embodied on the bottom of the receiving area 23. A gap 30 is formed between annular face 29, plane surface 28 and the valve insert 12. A hydraulic high-pressure connection 31 opens out into the gap 30, said high-pressure connection being connected to an unspecified high-pressure reservoir (common rail). The gap 30 forms a high-pressure space 33 in the pressure-limiting valve, which space is upstream of the valve seat 18. The throttle bore 15 furthermore extends into the gap 30 or, respectively, into the high pressure space 33.

The receiving space 11 is connected to the annular chamber 27 via a hydraulic connection channel 35. The low pressure of the low-pressure/return line also prevails in the receiving space 11 due to the connection of the annular chamber 27 to the low-pressure/return line via the low-pressure connection 26; and therefore the receiving space 11 constitutes a low-pressure space 36.

A valve chamber 40 is embodied above, i.e. upstream of, the valve seat 18 between guide bore 13 and valve piston 14. The valve chamber 40 is opened or closed towards the high-pressure chamber 33 via the valve seat 18 and is delimited towards the low-pressure space 36 by the guide section 41 of the valve piston 14 in the guide bore 13. The valve piston 14 has at least one flat spot 42; preferably three flat spots 42 are evenly distributed over the circumference thereof. The flat spots 42 extend up to the guide section 41. In addition, the volume of the valve chamber 40 is enlarged by means of the flat spots 42. The valve chamber 40 is opened or closed towards the high-pressure chamber 33 by means of the valve seat 18. When the valve seat 18 is closed, the pressure prevailing in the high-pressure reservoir is kept at the present level thereof. If the valve piston 14 lifts against the closing force of the closing spring 16, said valve piston releases the valve seat 18 and a gap between guide bore 13 and valve piston 14 is simultaneously unblocked via the flat spots 42, said gap producing a hydraulic connection of the valve chamber 40 to the low-pressure space 36. In so doing, the high pressure can be removed from the high-pressure space 33 into the low-pressure space 36 via the throttle bore 15 and the valve chamber 40 and be discharged therefrom into the low-pressure/return line.

When the valve seat 18 of the valve piston 14 is closed, it has been shown that a leakage pressure develops in the valve chamber 40 due to leakage at the valve seat 18. Said leakage pressure attacks the inner face of the valve piston 14, which is significantly larger with respect to the valve seat 18, and acts there as an assistant pressure in the opening direction of the valve piston 14 against the closing spring 16. In so doing, the opening pressure for opening the pressure-limiting valve, which is adjusted by the valve spring 16 or, respectively, via the adjusting disk 21, is reduced.

Figure 2:
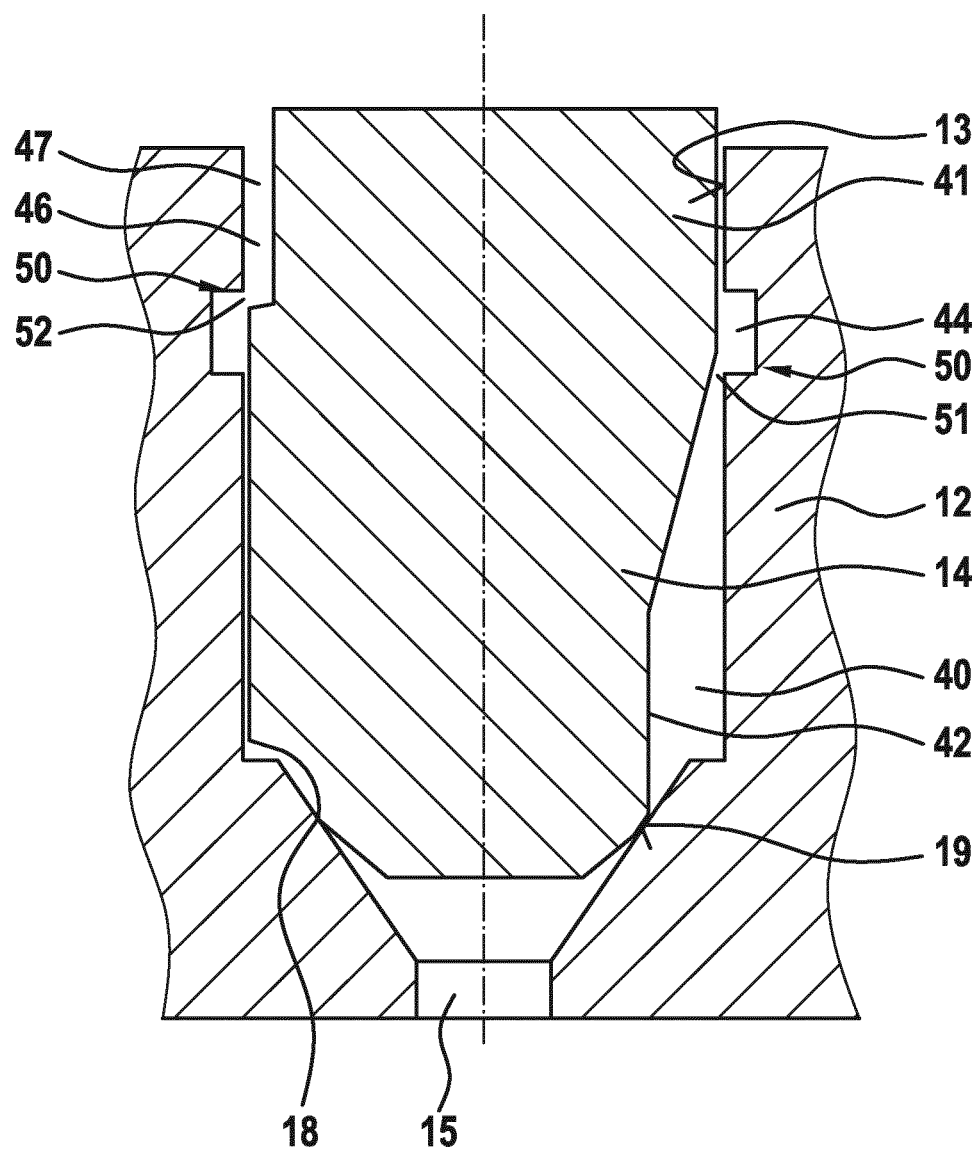

In order to remedy the situation present here, a leakage gap 50 is embodied in the region of the guide section 41 between guide bore 13 and valve piston 14. Pursuant to FIG. 2, the leakage gap 50 is formed by a leakage connection 51 on the valve chamber side and a leakage connection on the low-pressure side. The leakage connection 51 on the valve chamber side is produced by a radial relief groove 44 which is introduced into the inner wall of the guide bore 13 in the guide section 41 and into which the flat spot 42 embodied on the valve piston 14 is guided when the valve seat 18 is closed. The leakage connection 52 on the low-pressure side is formed by an axial relief channel 46 which is embodied on the valve piston 14 and connects the radial relief groove 44 to the low-pressure space 36. The radial relief groove 44 is expediently embodied as a circumferential groove on the inside of the guide bore 13. The axial relief channel 46 is expediently embodied as a flattened section configured on the valve piston 14 or as an axial groove 47 introduced on the valve piston 14.

When the valve seat 18 is closed, a hydraulic connection develops as a leakage gap 50 between valve chamber 40 and low-pressure space 36 by means of the leakage connection 51 on the valve chamber side and the leakage connection 52 on the low pressure side. The leakage accumulating in the valve chamber 40 can consequently drain into the relief groove 44 via the flattened section 42 and from there via the radial relief channel 46 into the low-pressure space 36. In so doing, no assistant pressure exerted by the leakage builds up in the valve chamber 40; thus enabling the opening force of the valve piston 14 to be exclusively formed by the closing force of the closing spring 16.

What is claimed is:

1. A pressure-limiting valve, comprising a valve support (10), a valve insert (12) which is connected to the valve support (10), a valve piston (14) which is mounted such that the valve piston can slide in the valve insert (12) in a guide bore (13) and a closing spring (16) which acts on the valve piston (14) with a closing force in a closing direction, and the valve piston (14) acts on a valve seat (18) by means of the closing force, said valve seat producing a hydraulic connection via a valve chamber (40) between a high-pressure space (33) and a low-pressure space (36), as soon as a hydraulic force which acts on the valve piston (14) in an opening direction exceeds the closing force of the closing spring (16), wherein a leakage gap (50) is formed between the valve chamber (40) and the low-pressure space (36) when the valve seat (18) is closed, wherein the leakage gap (50) enables leakage to be discharged out of the valve chamber (40) into the low-pressure space (36), wherein the leakage gap (50) is formed by a first leakage connection (51) on a valve chamber side of the pressure-limiting valve and a second leakage connection (52) on a low-pressure side of the pressure-limiting valve, wherein the first leakage connection (51) is formed by a radial relief groove (44), and wherein the second leakage connection (52) is formed by an axial relief channel (46) which connects the radial relief groove (44) to the low-pressure space (36).

2. The pressure-limiting valve according to claim 1, wherein the leakage gap (50) is formed in a guide section (41) between the guide bore (13) and the valve piston (14).

3. The pressure-limiting valve according to claim 1, wherein at least one flat spot (42) embodied on the valve piston (14) is guided into the radial relief groove (44) when the valve seat (18) is closed.

4. The pressure-limiting valve according to claim 3, wherein the radial relief groove (44) is embodied in a circumferential manner on an inside of the guide bore (13) in the guide section (41).

5. The pressure-limiting valve according to claim 1, wherein the axial relief channel (46) is formed by at least one of a flattened section embodied on the valve piston (14) and an axial groove (47) in the valve piston (14).

6. A pressure-limiting valve, comprising a valve support (10), a valve insert (12) which is connected to the valve support (10), a valve piston (14) which is mounted such that the valve piston can slide in the valve insert (12) in a guide bore (13) and a closing spring (16) which acts on the valve piston (14) with a closing force in a closing direction, and the valve piston (14) acts on a valve seat (18) by means of the closing force, said valve seat producing a hydraulic connection via a valve chamber (40) between a high-pressure space (33) and a low-pressure space (36), as soon as a hydraulic force which acts on the valve piston (14) in an opening direction exceeds the closing force of the closing spring (16), wherein a leakage gap (50) is formed between the valve chamber (40) and the low-pressure space (36) when the valve seat (18) is closed, wherein the leakage gap (50) enables leakage to be discharged out of the valve chamber (40) into the low-pressure space (36), and wherein the valve piston (14) has three flat spots (42) evenly distributed over a circumference thereof.

7. The pressure-limiting valve according to claim 6, wherein the leakage gap (50) is formed in a guide section (41) between the guide bore (13) and the valve piston (14).

8. The pressure-limiting valve according to claim 6, wherein the leakage gap (50) is formed by a first leakage connection (51) on a valve chamber side and a second leakage connection (52) on a low-pressure side.

9. The pressure-limiting valve according to claim 8, wherein the first leakage connection (51) on the valve chamber side is formed by a radial relief groove (44), into which at least one flat spot (42) embodied on the valve piston (14) is guided when the valve seat (18) is closed.

10. The pressure-limiting valve according to claim 9, wherein the radial relief groove (44) is embodied in a circumferential manner on an inside of the guide bore (13) in the guide section (41).

11. The pressure-limiting valve according to claim 9, wherein the second leakage connection (52) on the low-pressure side is formed by an axial relief channel (46) which connects the radial relief groove (44) to the low-pressure space (36).

12. The pressure-limiting valve according to claim 11, wherein the axial relief channel (46) is formed by at least one of a flattened section embodied on the valve piston (14) and an axial groove (47) in the valve piston (14).

* * * * *